United States Patent
Naruse

[11] Patent Number: 6,108,370
[45] Date of Patent: Aug. 22, 2000

[54] RECEIVING APPARATUS, RECEIVING METHOD, AND TERMINAL UNIT FOR USE WITH RADIO SYSTEM

[75] Inventor: Tetsuya Naruse, Chiba, Japan

[73] Assignee: Sony Corporation, Tokyo, Japan

[21] Appl. No.: 08/997,877

[22] Filed: Dec. 24, 1997

[30] Foreign Application Priority Data

Jan. 6, 1997 [JP] Japan ................................. 9-000396

[51] Int. Cl.[7] .................................................. H04J 13/04
[52] U.S. Cl. .......................... 375/150; 375/147; 370/335
[58] Field of Search .................................. 370/335, 342, 370/479; 375/130, 140, 147, 150, 347, 349

[56] References Cited

U.S. PATENT DOCUMENTS

| | | | |
|---|---|---|---|
| 5,508,708 | 4/1996 | Ghosh et al. ........................... | 324/457 |
| 5,627,835 | 5/1997 | Witter ..................................... | 370/320 |
| 5,764,687 | 6/1998 | Easton .................................... | 375/206 |
| 5,818,887 | 10/1998 | Sexton et al. ......................... | 375/355 |
| 5,889,815 | 3/1999 | Iwakiri ................................... | 375/208 |
| 5,945,948 | 8/1999 | Buford et al. ......................... | 342/457 |
| 5,950,131 | 9/1999 | Vilmur .................................... | 455/434 |
| 5,956,367 | 9/1999 | Koo et al. .............................. | 375/206 |

*Primary Examiner*—Young T. Tse
*Attorney, Agent, or Firm*—Jay H. Maioli

[57] ABSTRACT

While the phase of a PN code is being shifted every predetermined number of chips, correlation values with a received code are obtained. A plurality of the largest correlation values are selected from those that have been detected and designated to fingers. When a correlation value is obtained for each phase, the maximum value of the correlation values that have been detected is detected by a maximum value detecting circuit. The maximum value is stored in a maximum value memory. When a plurality of the largest correlation values are selected, the maximum value that has been stored in the maximum value memory is used.

4 Claims, 13 Drawing Sheets

RECEIVING APPARATUS, RECEIVING METHOD, AND TERMINAL UNIT FOR USE WITH RADIO SYSTEM

BACKGROUND OF THE INVENTION

1. Field of the Invention

The present invention relates to a receiving apparatus suitable for a CDMA (Code Division Multiple Access) type cellular telephone system, a receiving method thereof, and a terminal unit for use with a radio system thereof.

2. Description of the Related Art

In recent years, a CDMA type cellular telephone system has become attractive. In the CDMA type cellular telephone system, a pseudo-random code is used as a spread code. A carrier of a transmission signal is spectrum-spread. The pattern and phase of each spread code in the code sequence are varied so as to perform a multiple access.

In the CDMA system, the spectrum spread method is used. In the spectrum spread system, when data is transmitted, the carrier is primarily modulated with the transmission data. In addition, the carrier that has been primarily modulated is multiplied by a PN (Pseudorandom Noise) code. Thus, the carrier is modulated with the PN code. An example of the primarily modulating method is the balanced QPSK modulating method. Since the PN code is a random code, when the carrier is modulated by the PN code, the frequency spectrum is widened.

When data is received, the received data is multiplied by the same PN code that has been modulated on the transmission side. When the same PN code is multiplied and the phase is matched, the received data is de-spread and thereby primarily modulated data is obtained. When the primarily modulated data is demodulated, the original data is obtained.

In the spectrum spread method, to de-spread the received signal, the same PN code that has been modulated on the transmission side is required for both the pattern and the phase. Thus, when the pattern and the phase of the PN code are varied, the multiple access can be performed. The method for varying the pattern and the phase of each spread code in the code sequence and thereby performing the multiple access is referred to as the CDMA method.

In cellular telephone systems, an FDMA (Frequency Division Multiple Access) system and a TDMA (Time Division Multiple Access) system have been used. However, the FDMA system and the TDMA system cannot deal with a drastic increase of the number of users.

In other words, in the FDMA system, the multiple access is performed on different frequency channels. In an analog cellular telephone system, the FDMA system is usually used.

However, in the FDMA system, since the frequency use efficiency is bad, a drastic increase of the number of users tends to cause channels to run short. When the intervals of channels are narrowed to accommodate the increase of the number of channels, the adjacent channels adversely interfere with each other and thereby the sound quality deteriorates.

In the TDMA system, the transmission data is compressed on the time base. Thus, the use time is divided and thereby the same frequency is shared. The TDMA system has been widely used as a digital cellular telephone system. In the TDMA system, the frequency use efficiency is improved in comparison with the simple FDMA system. However, in the TDMA system, the number of channels is restricted. Thus, it seems that as the number of users drastically increases, the number of channels runs short.

On the other hand, the CDMA system has excellent interference resistance. Thus, in the CDMA system, adjacent channels do not interfere with each other. Consequently, the frequency use efficiency improves and more channels can be obtained.

In the FDMA system and the TDMA system, signals tend to be affected by fading due to multipaths.

In other words, as shown in FIG. 9, a signal is sent from a base station 201 to a portable terminal unit 202 through a plurality of paths. In addition to a path P1 in which a radio wave of the base station 201 is directly sent to the portable terminal unit 202, there are a path P2, a path P3, and so forth. In the path P2, the radio wave of the base station 201 is reflected by a building 203A and sent to the portable terminal unit 202. In the path P3, the radio wave of the base station 201 is reflected by a building 203B and sent to the portable terminal unit 202.

The radio waves that are reflected by the buildings 203A and 203B and sent to the portable terminal unit 202 through the paths P2 and P3 are delayed from the radio wave that is directly sent from the base station 201 to the portable terminal unit 202 through the path P1. Thus, as shown in FIG. 9, signals S1, S2, and S3 reach the portable terminal unit 202 through the paths P1, P2, and P3 at different timings, respectively. When the signals S1, S2, and S3 through the paths P1, P2, and P3 interfere with each other, a fading takes place. In the FDMA system and the TDMA system, the multi-paths cause the signal to be affected by the fading.

On the other hand, in the CDMA system, with diversity RAKE method, the fading due to the multi-paths can be alleviated and the S/N ratio can be improved.

In the diversity RAKE system, as shown in FIG. 10, receivers 221A, 221B, and 221C that receive signals S1, S2, and S3 through the paths P1, P2, and P3 are disposed, respectively. A timing detector 222 detects codes received through the individual paths. The codes are set to the receivers 221A, 221B, 221C corresponding to the paths P1, P2, and P3, respectively. The receivers 221A, 221B, and 221C demodulate the signals received through the paths P1, P2, and P3. The received output signals of the receivers 221A, 221B, and 221C are combined by a combining circuit 223.

In the spectrum spread system, signals received through different paths are prevented from interfering with each other. The signals received through the paths P1, P2, and P3 are separately demodulated. When the demodulated output signals received through the respective paths are combined, the signal intensity becomes large and the S/N ratio improves. In addition, the influence of the fading due to the multi-paths can be alleviated.

In the above-described example, for simplicity, with the three receivers 221A, 221B, and 221C and the timing detector 222, the structure of the diversity RAKE system was shown. However, in reality, in a cellular telephone terminal unit of diversity RAKE type, as shown in FIG. 11, fingers 251A, 251B, and 251C, a searcher 251, and a data combiner 253 are disposed. The fingers 251A, 251B, and 251C obtain demodulated output signals for the respective paths. The searcher 252 detects signals through multi-paths. The combiner 253 combines the demodulated data for the respective paths.

In FIG. 11, a received signal as a spectrum spread signal that has been converted into an intermediate frequency is supplied to an input terminal 250. This signal is supplied to a semi-synchronous detecting circuit 255. The semi-synchronous detecting circuit 255 is composed of a multiplying circuit. The semi-synchronous detecting circuit 255 multiplies a signal received from the input terminal 250 by an output signal of a PLL synthesizer 256. An output signal of the PLL synthesizer 256 is controlled with an output signal of a frequency combiner 257. The semi-synchronous detecting circuit 255 performs a quadrature detection for the received signal.

An output signal of the semi-synchronous detecting circuit 255 is supplied to an A/D converter 254. The A/D converter 254 converts the input signal into a digital signal. At this point, the sampling frequency of a controller 258 is much higher than the frequency of the PN code that is spectrum-spread. In other words, the input signal of the A/D converter 254 is over-sampled.

An output signal of the controller 258 is supplied to the fingers 251A, 251B, and 251C. In addition, the output signal of the controller 258 is supplied to the searcher 252. The fingers 251A, 251B, and 251C de-spread the signals received through the respective paths, synchronize the signals, acquire the synchronization of the received signals, demodulate the data of these signals, and detect frequency errors of the signals.

The searcher 252 acquires the codes of the received signals and designates the codes of the paths to the fingers 251A, 251B, and 251C. In other words, the searcher 252 has a de-spreading circuit that multiplies a received signal by a PN code and de-spreads the signal. In addition, the searcher 252 shifts the phase of the PN code and obtains the correlation with the received code under the control of the controller 258. With the correlation between a designated code and a received code, a code for each path is determined.

An output signal of the searcher 252 is supplied to the controller 258. The controller 258 designates the phases of the PN codes for the fingers 251A, 251B, and 251C corresponding to the output signal of the searcher 252. The fingers 251A, 251B, and 251C de-spread the received signals and demodulate the received signals received through the respective phases corresponding to the designated phases of the PN codes.

The demodulated data is supplied from the fingers 251A, 251B, and 251C to the data combiner 253. The data combiner 253 combines the received signals received through the respective paths. The combined signal is obtained from an output terminal 259.

The fingers 251A, 251B, and 251C detect frequency errors. The frequency errors are supplied to the frequency combiner 257. With an output signal of the frequency combiner 257, the oscillation frequency of the PLL synthesizer 256 is controlled.

In the portable telephone terminal unit of the above-described RAKE type, the searcher 252 has the structure as shown in FIG. 13.

In FIG. 13, a digital signal is supplied from the A/D converter 254 (see FIG. 12) to an input terminal 301. As described above, the sampling frequency of the A/D converter 254 is higher than the frequency of a PN code. In other words, the digital signal is over-sampled. The digital signal is supplied from the input terminal 301 to a decimating circuit 302. The decimating circuit 302 decimates the signal received from the input terminal 301. An output signal of the decimating circuit 302 is supplied to a multiplying circuit 303.

A PN code generating circuit 304 generates a PN code that has spread on the transmission side. The phase of the PN code received from the PN code generating circuit 304 can be designated by a controller 258. The PN code received from the PN code generating circuit 304 is supplied to the multiplying circuit 303.

The multiplying circuit 303 multiplies the output signal of the decimating circuit 302 by the PN code received from the PN code generating circuit 304. Thus, the received signal from the input terminal 301 de-spreads. When the pattern and the phase of the received code match the pattern and the phase of the code received from the PN code generating circuit 304, the received signal de-spreads. Thus, the level of an output signal of the multiplying circuit 303 becomes large. The output signal of the multiplying circuit 303 is supplied to a level detecting circuit 307 through a band pass filter 306. The level detecting circuit 307 detects the level of the output signal of the multiplying circuit 303.

An output signal of the level detecting circuit 307 is supplied to an adding circuit 308. The adding circuit 308 cumulates output data a predetermined number of times (for example, 64 times). With the cumulated value of the output data of the level detecting circuit 307, correlation values of the code designated to the PN code generating circuit 304 and the received code are obtained. An output signal of the adding circuit 308 is supplied to a memory 309.

The phase of the PN code received from the PN code generating circuit 304 is shifted every predetermined number of chips. The correlation value is obtained from the output signal of the adding circuit 308 for each phase. The correlation value is stored in the memory 309. After the PN code has been designated for one period, the correlation values stored in the memory 309 are sorted in the order of larger correlation values by the controller 258. For example, three phases with the largest correlation values are selected. The selected phases are designated to the fingers 251A, 251B, and 251C (see FIG. 12).

FIG. 14 is a flow chart showing a process of the searcher. In FIG. 14, the phase of the PN code generating circuit 304 is designated to and initial value (at step ST101). The number of additions is cleared (at step ST102). The cumulated value of the adding circuit 308 is cleared (at step ST103).

When the initial phase is designated to the PN code generating circuit 304, the multiplying circuit 303 de-spreads the received signal with the designated PN code. The adding circuit 308 cumulates the de-spread signal level (at step ST104). Whenever the signal level is cumulated, the number of additions is incremented (at step ST105). Next, it is determined whether or not the number of additions exceeds a predetermined value (for example, 64) (at step ST106). The signal level is cumulated until the number of additions becomes 64. Thus, the correlation value is obtained. When the number of additions becomes 64, the correlation value at the time is stored in the memory 309 (at step ST107).

It is determined whether or not the last phase of the PN code generating circuit 304 has been designated (at step ST108). When the last phase has not been designated, the phase of the PN code is advanced or delayed by a predetermined value (at step ST109). Thereafter, the flow returns to step ST102. With the phase of the PN code that has been shifted for the predetermined value, the above-described process is repeated.

When the phase of the PN code is shifted for one period, at step ST108, the last phase of the PN code has been designated. Thus, the determined result at step ST108 becomes Yes. At this point, the correlation values stored in the memory 309 are sorted and the largest three correlation values are obtained (at step ST110). The three phases corresponding to the three largest correlation values are designated to the fingers 951A, 251B, and 251C (at step ST111).

As described above, in the searcher of a conventional CDMA portable telephone terminal unit of diversity RAKE type, while the phase of the PN code received from the PN code generating circuit 304 is being shifted, the correlation values of the received code and designated code are obtained. For example, three phases with the largest correlation values are designated to the fingers 251A, 251B, and 251C. Thus, when three paths are selected in the order of larger correlation values, the correlation values stored in the memory 309 are sorted and arranged in the order of larger correlation values.

Examples of the algorithm of the sorting process are quick sorting method and heap sorting method. However, in the algorithm of such a sorting process, a plurality of comparing calculations are required. Thus, the load applied to the controller 258 becomes large.

OBJECT AND SUMMARY OF THE INVENTION

Therefore, an object of the present invention is to provide a receiving apparatus for designating an optimum path to each finger without increasing the load to the controller, a receiving method thereof, and a terminal unit for use with a radio system thereof.

The present invention is a receiving apparatus for receiving a signal that has been spectrum-spread with a spread code, comprising a searcher for searching paths of signals received from multi-paths, a plurality of fingers for de-spreading the received signals for the searched paths and demodulating data, and a combiner for combining output data of the fingers, wherein the searcher has a code generating means for generating a code whose phase is successively shifted in the same pattern as the spread code that is transmitted, a de-spreading means for multiplying the received signal by the code generated by the code generating means so as to de-spread the spread signal to the original data, a correlation value detecting means for obtaining correlation values for individual phases designated by the code generating means with output data of the de-spreading means, and a maximum value detecting means for detecting the maximum value of the correlation values and storing the maximum value, and wherein the data is demodulated with a phase corresponding to the maximum value stored in the maximum value detecting means.

The present invention is a receiving method for receiving a signal that has been spectrum-spread with a spread code, comprising the steps of causing a searcher to search paths of signals received from multi-paths, causing a plurality of fingers to de-spread the received signals for the searched paths and to demodulate data, and causing a combiner to combine output data of the fingers, wherein the searcher generates a code whose phase is successively shifted in the same pattern as the spread code that is transmitted, multiplies the received signal by the code generated so as to de-spread the spread signal to the original data, obtains correlation values for individual phases designated with output data that has been de-spread, and detects the maximum value of the correlation values and stores the maximum value, and wherein the data is demodulated with a phase corresponding to the maximum value.

The present invention is a terminal unit for use with a radio system for spectrum-spreading a transmission signal with a spread code, transmitting the resultant signal, varying the pattern and phase of a code sequence of the spread code, and performing a multiple-access, comprising a searcher for searching paths of signals received from multi-paths, a plurality of fingers for de-spreading the received signals for the searched paths and demodulating data, and a combiner for combining output data of the fingers, wherein the searcher has a code generating means for generating a code whose phase is successively shifted in the same pattern as the spread code that is transmitted, a de-spreading means for multiplying the received signal by the code generated by the code generating means so as to de-spread the spread signal to the original data, a correlation value detecting means for obtaining correlation values for individual phases designated by the code generating means with output data of the de-spreading means, and a maximum value detecting means for detecting the maximum value of the correlation values and storing the maximum value, and wherein the data is demodulated with a phase corresponding to the maximum value stored in the maximum value detecting means.

While the phase of the PN code is being successively shifted by a predetermined number of chips, the correlation value of the designated PC code and the received code are obtained. A plurality of largest correlation values are selected and designated to fingers. While the correlation values are being obtained for each phase, the maximum value of the obtained correlation values is detected and stored in the maximum value memory. When a plurality of largest correlation values are selected, the maximum value stored in the maximum value memory is used. Thus, since a complicated sorting process is not required, the load applied to the controller is alleviated.

The above and other objects and features of the present invention will become apparent fom the following detailed description and the appended claims with reference to the accompanying drawings.

DETAILED DESCRIPTION OF THE PREFERRED EMBODIMENT

Figure 1:
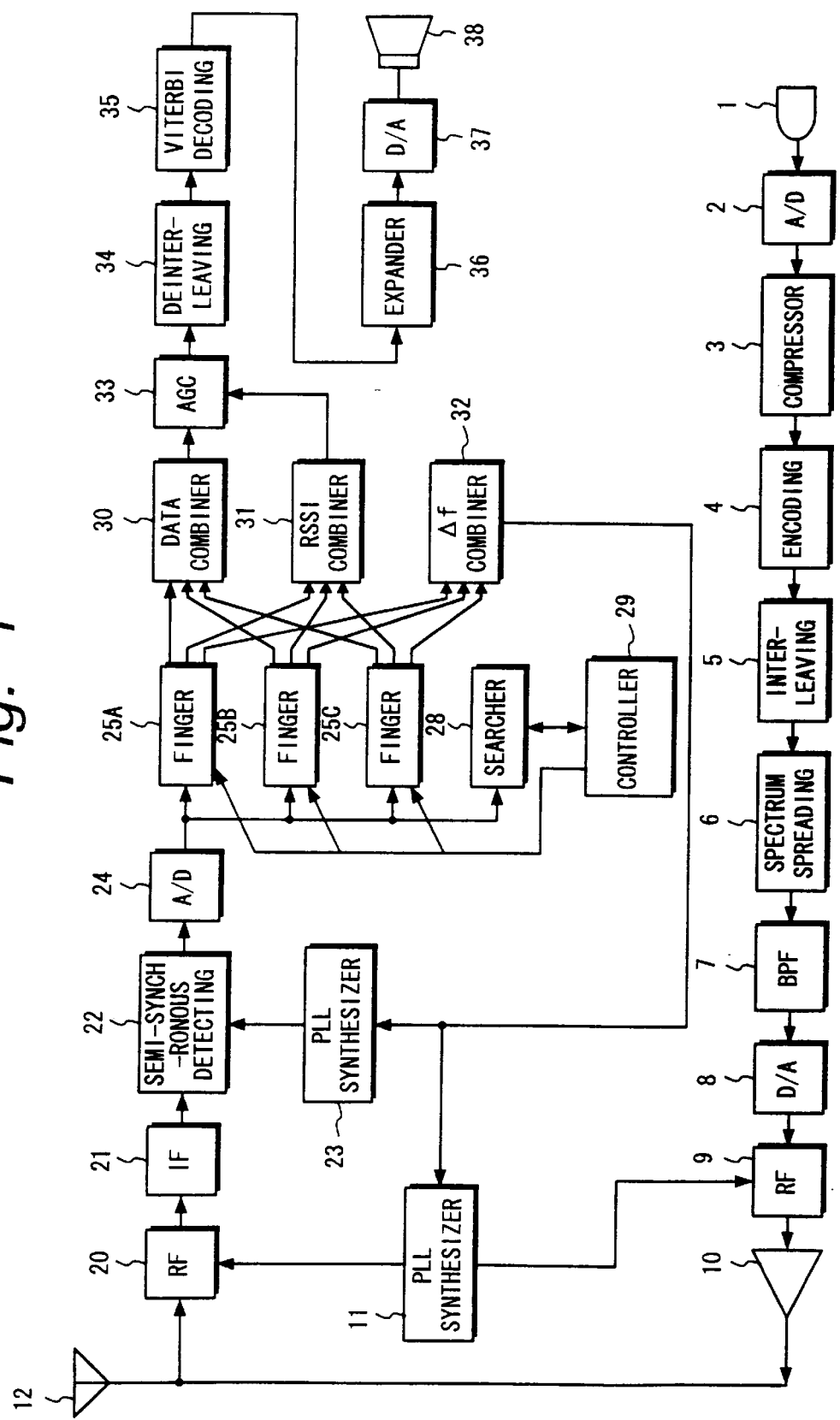
FIG. 1 is a block diagram showing the overall structure of a portable telephone terminal unit of CDMA type according to the present invention.

With reference to the accompanying drawings, an embodiment of the present invention will be described. FIG. 1 is a block diagram showing an example of a portable terminal unit for use with a cellular telephone system of CDMA type according to the present invention. The portable terminal unit uses diversity RAKE system as the receiving system. In the diversity RAKE system, signals are received from a plurality of paths at the same time. The received signals are combined.

In FIG. 1, in the transmission mode, an audio signal is input to a microphone 1. The audio signal is supplied to an A/D converter 2. The A/D converter 2 converts an analog audio signal into a digital audio signal. An output signal of the A/D converter 2 is supplied to a audio compressing circuit 3.

The audio compressing circuit 3 compresses and encodes the digital audio signal. As examples of the compressing and encoding system, various types have been proposed. For example, a system such as QCELP (Qualcomm Code Excited Linear Predictive Coding) system can be used. In the QCELP system, depending on the characteristics of the sound of the user and the congestion state of the communication path, a plurality of encoding speeds can be used. In this case, four encoding speeds (9.6 kbps, 4.8 kbps, 2.4 kbps, and 1.2 kbps) can be selected. To maintain the communication quality, data can be encoded at the minimum speed. It should be noted that the audio compressing system is not limited to the QCELP system.

An output signal of the audio compressing circuit 3 is supplied to a convolutional encoding circuit 4. The convolutional encoding circuit 4 adds an error correction code as a convolutional code to the transmission data. An output signal of the convolutional encoding circuit 4 is supplied to an interleaving circuit 5. The interleaving circuit 5 interleaves the transmission data. An output signal of the interleaving circuit 5 is supplied to a spectrum spreading circuit 6.

The spectrum spreading circuit 6 primarily modulates the carrier and spreads the resultant signal with a PN code. In other words, the spectrum spreading circuit 6 primarily modulates the transmission data corresponding to for example the balanced QPSK modulating method. In addition, the resultant signal is multiplied by a PN code. Since the PN code is a random code, when the PN code is multiplied, the frequency band of the carrier is widened. Thus, the carrier is spectrum-spread. As an example of the modulating method for the transmission data, the balanced QPSK modulating method is used. However, another modulating method can be used in various methods that have been proposed.

An output signal of the spectrum spreading circuit 6 is supplied to a D/A converter 8 through a band pass filter 7. An output signal of the D/A converter P is supplied to an RE circuit 9.

A local oscillation signal is supplied from a PLL synthesizer 11 to the RE circuit 9. The RF circuit 9 multiplies the output signal of the D/A converter 8 by the local oscillation signal of the PLL synthesizer 11 and thereby converts the frequency of the transmission signal into a predetermined frequency. An output signal of the RE circuit 9 is supplied to an transmission amplifier 10. After the power of the transmission signal is amplified, the resultant signal is supplied to an antenna 12. A radio wave is sent from the antenna 12 to a base station.

In the reception mode, a radio wave sent from a base station is received by the antenna 12. Since the radio wave sent from the base station is reflected by buildings and so forth, the radio wave reaches the antenna 12 of the portable terminal unit through multi-paths. When the portable terminal unit is used in a car or the like, the frequency of the received signal may vary due to the Doppler effect.

The output signal of the antenna 12 is supplied to an RF circuit 20. The RF circuit 20 receives a local oscillation signal from the PLL synthesizer 11. The RF circuit 20 converts the received signal into an intermediate frequency signal with a predetermined frequency.

An output signal of the RF circuit 20 is supplied to a semi-synchronous detecting circuit 22 through an intermediate frequency circuit 21. An output signal of a PLL synthesizer 23 is supplied to the semi-synchronous detecting circuit 22. The frequency of the output signal of the PLL synthesizer 23 is controlled with an output signal of a frequency combiner 32. The semi-synchronous detecting circuit 22 quadrature-detects the received signal.

An output signal of the semi-synchronous detecting circuit 22 is supplied to an A/D converter 24. The A/D converter 24 digitizes the output signal of the semi-synchronous detecting circuit 22. At this point, the sampling frequency of the A/D converter 24 is higher than the frequency of the PN code that has been spectrum-spread. In other words, the input signal of the A/D converter 24 is over-sampled. An output signal of the A/D converter 24 is supplied to fingers 25A, 25B, and 25C. In addition, the output signal of the A/D converter 24 is supplied to a searcher 28.

As described above, in the reception mode, signals are received through multi-paths. The fingers 25A, 25B, and 25C multiply the signals received through the multi-paths by the PN code so as to de-spread the received signals. In addition, the fingers 25A, 25B, and 25C output the levels of the signals received through the multi-paths and the frequency errors of these multi-paths.

The searcher 28 acquires the codes of the received signals and designates the codes for the paths. In other words, the searcher 28 has a de-spreading circuit that multiplies the received signals by the respective PN codes and de-spread the received signals. The searcher 28 shifts the phases of the PN codes under the control of a controller 29 and obtains the correlation with the received codes. With the correlation values of the designated codes and the received codes, the codes for the respective paths are designated. The codes designated by the controller 29 are supplied to the fingers 25A, 25B, and 25C.

The received data for the respective paths demodulated by the fingers 25A, 25B, and 25C is supplied to a data combiner 30. The data combiner 30 combines the received data for the respective paths. An output signal of the data combiner 30 is supplied to an AGC circuit 33.

The fingers 25A, 25B, and 25C obtain the intensities of the signals received through the respective paths. The intensities of the signals received through the respective path are supplied from the fingers 25A, 25B, and 25C to a RSSI combiner 31. The RSSI combiner 31 combines the intensities of the signals received through the respective paths. An output signal of the RSSI combiner 31 is supplied to the AGC circuit 33. The gain of the AGC circuit 33 is controlled so that the signal level of the received data becomes constant.

The frequency errors for the respective paths are supplied from the fingers 25A, 25B, and 25C to the frequency combiner 32. The frequency combiner 32 combines the frequency errors for the respective paths. An output signal of the frequency combiner 32 is supplied to the PLL synthesizers 11 and 23. Corresponding to the resultant frequency error, the frequencies of the PLL synthesizers 11 and 23 are controlled.

An output signal of an AGC circuit 33 is supplied to a de-interleaving circuit 34. The de-interleaving circuit 34 de-interleaves the received data that has been interleaved on the transmission side. An output signal of the de-interleaving circuit 34 is supplied to a Viterbi decoding circuit 35. The Viterbi decoding circuit 35 decodes a convolutional code with a soft determining process and a maximum likelihood decoding process. The Viterbi decoding circuit 35 performs an error correcting process. An output signal of the Viterbi decoding circuit 35 is supplied to an audio expanding circuit 36.

The audio expanding circuit 36 decompresses the audio signal that has been compressed with for example the QCELP method and decodes a digital audio signal. The digital audio signal is supplied to a D/A converter 37. The D/A converter 37 restores a digital audio signal to an analog audio signal. The analog audio signal is supplied to a speaker 38.

In the portable terminal unit of the cellular telephone system of CDMA type according to the present invention, with the RAKE system, received signals through a plurality of paths are combined. In the portable telephone terminal unit according to the present invention, the searcher 28 has a circuit that detects the maximum value of the correlation values and stores the maximum value. Thus, when an optimum path is determined, since the sorting process for the correlation values can be simplified, the load applied to the controller 29 can be alleviated.

Figure 2:
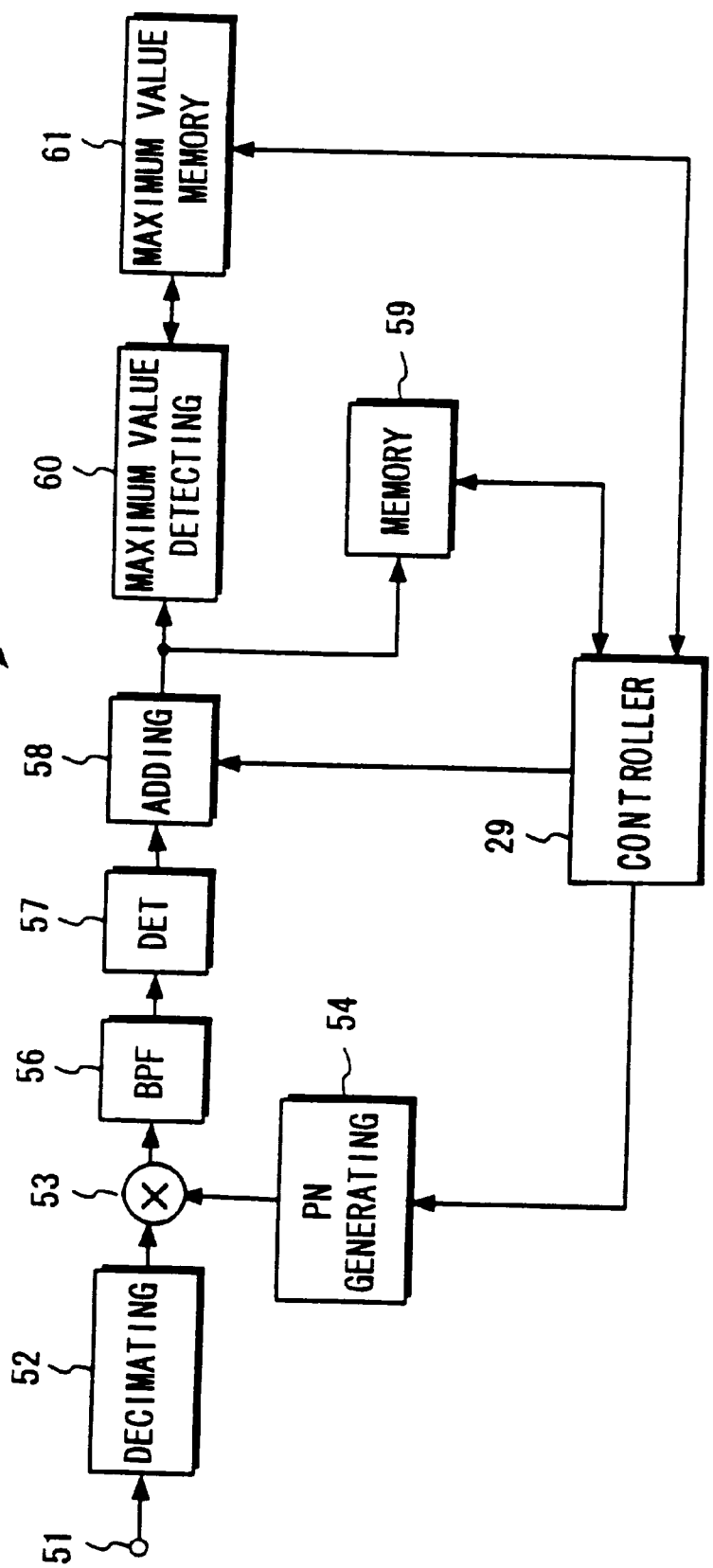
FIG. 2 is a block diagram showing an example of the structure of a searcher of the portable telephone terminal unit of CDMA type according to the present invention.

FIG. 2 is a block diagram showing the structure of the searcher 28 of the portable telephone terminal unit according to the present invention. In FIG. 2, a digital signal is supplied from the A/D converter 24 (see FIG. 1) to an input terminal 51. As described above, the sampling frequency of the A/D converter 24 is higher than the frequency of a PN code. In other words, the digital signal is over-sampled. The digital signal is supplied from the input terminal 51 to a decimating circuit 52. The decimating circuit 52 decimates the signal received from the input terminal 51. An output signal of the decimating circuit 52 is supplied to a multiplying circuit 53.

A PN code generating circuit 54 generates a PN code that has spread on the transmission side. The phase of the PN code received from the PN code generating circuit 54 can be designated by a controller 29. The PN code received from the PN code generating circuit 54 is supplied to the multiplying circuit 53.

The multiplying circuit 53 multiplies the output signal of the decimating circuit 52 by the PU code received from the PN code generating circuit 54. Thus, the received signal from the input terminal 51 de-spreads. When the pattern and the phase of the received code match the pattern and the phase of the code received from the PN code generating circuit 54, the received signal de-spreads. Thus, the level of an output signal of the multiplying circuit 53 becomes large. The output signal of the multiplying circuit 53 is supplied to a level detecting circuit 57 through a band pass filter 56. The level detecting circuit 57 detects the level of the output signal of the multiplying circuit 53.

An output signal of the level detecting circuit 57 is supplied to an adding circuit 58. The adding circuit 58 cumulates output data a predetermined number of times (for example, 64 times). With the cumulated value of the output data of the level detecting circuit 57, correlation values of the code designated to the PN code generating circuit 54 and the received code are obtained. An output signal of the adding circuit 58 is supplied to a memory 59. In addition, the output signal of the adding circuit 58 is supplied to a maximum value detecting circuit 60. The maximum value detecting circuit 60 obtains the maximum value of the correlation values. The maximum value of the correlation value is stored in a maximum value memory 61.

The phase of the PN code received from the PN code generating circuit 54 is shifted every a predetermined number of chips (for example, every chip or every ½ chip). The correlation values are obtained from the output signal of the adding circuit 58 for each phase. The correlation values are stored in the memory 59. After the PN code has been designated for one period, for example three phases with the largest correlation values are selected. The selected phases are designated to the fingers 25A, 25B, and 25C (see FIG. 1). When the three phases are selected in the order of the larger correlation values and three paths are designated, the maximum value stored in the maximum value memory 61 is used. Thus, since a complicated sorting process of the controller 29 is not required, the load applied to the controller 29 is alleviated.

Examples of the algorithm of the sorting process are a quick sorting method and a heap sorting method. However, in the algorithm of such a sorting process, a plurality of comparing calculations are required. Thus, the load applied to the controller 29 becomes large. On the other hand, when the maximum value of the correlation values is known, by comparing the correlation values with the maximum value, larger correlation values can be easily obtained. Thus, when the maximum value of the correlation values is stored in the maximum value memory 61, the load applied to the controller 29 can be alleviated.

Figure 3:
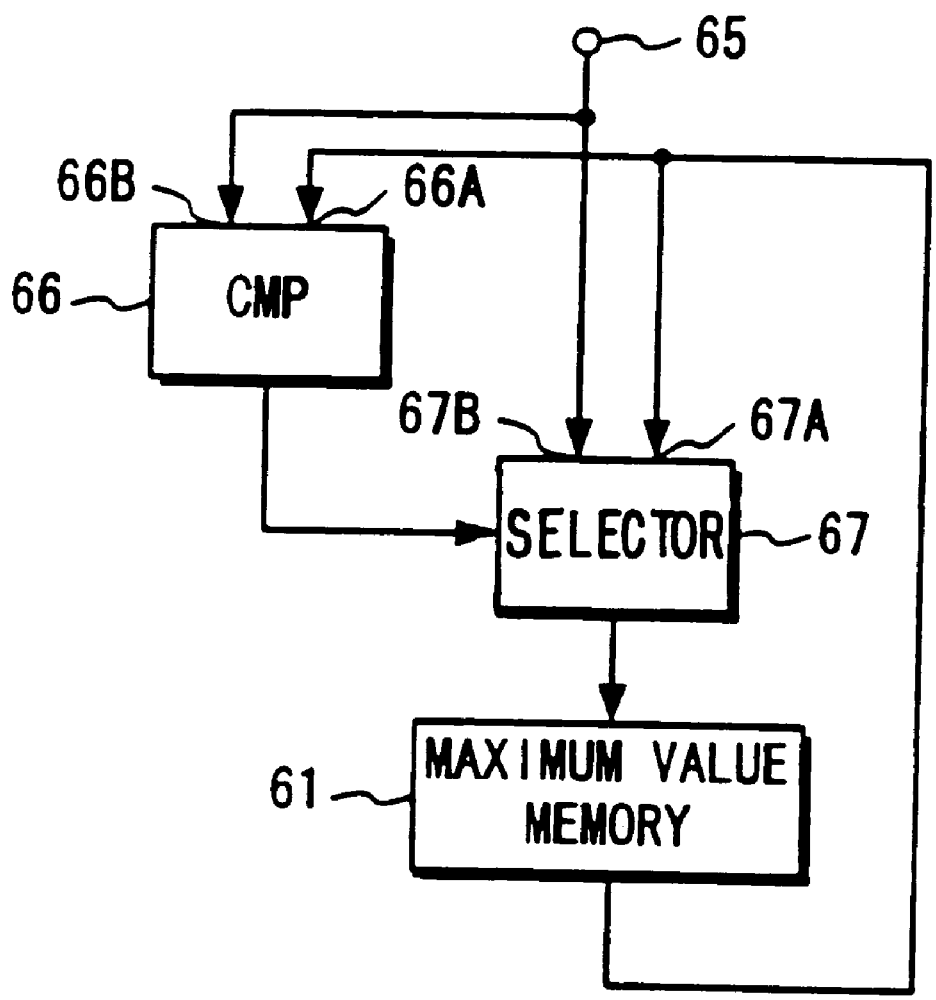
FIG. 3 is a block diagram showing an example of a maximum value detecting circuit of the searcher of the portable telephone terminal unit of CDMA type according to the present invention.

As shown in FIG. 3, the maximum value detecting circuit 60 can be composed of a comparator 66 and a selector. Referring to FIG. 3, correlation values obtained by the adding circuit 58 are supplied to an input terminal 65. The correlation values are supplied to a terminal 66B of the comparator 66 and to a terminal 67B of the selector 67. The maximum value of the correlation values at the point is stored in the maximum value memory 61. Output data of the maximum value memory 61 is supplied to a terminal 66A of the comparator 66 and to a terminal 67B of the selector 67.

The comparator 66 compares the maximum value of the correlation values stored in the maximum value memory 61 with the current correlation value. Output data of the comparator 66 is supplied as compared data to the selector 67. Corresponding to the compared result, the selector 67 is controlled.

When the maximum value stored in the maximum value memory 61 is larger than the current correlation value, the selector 67 is switched to the position of the terminal 67A. Thus, the maximum value stored in the maximum value memory 61 is stored as the new maximum value to the maximum value memory 61. When the current correlation value is larger than the maximum value stored in the maximum value memory 61, the selector 67 is switched to the position of the terminal 67B. Thus, the current correlation value is stored as the new maximum value to the maximum value memory 61.

With the above-described process, the maximum value of the correlation values that have been obtained is always stored in the maximum value memory 61.

Figure 4:
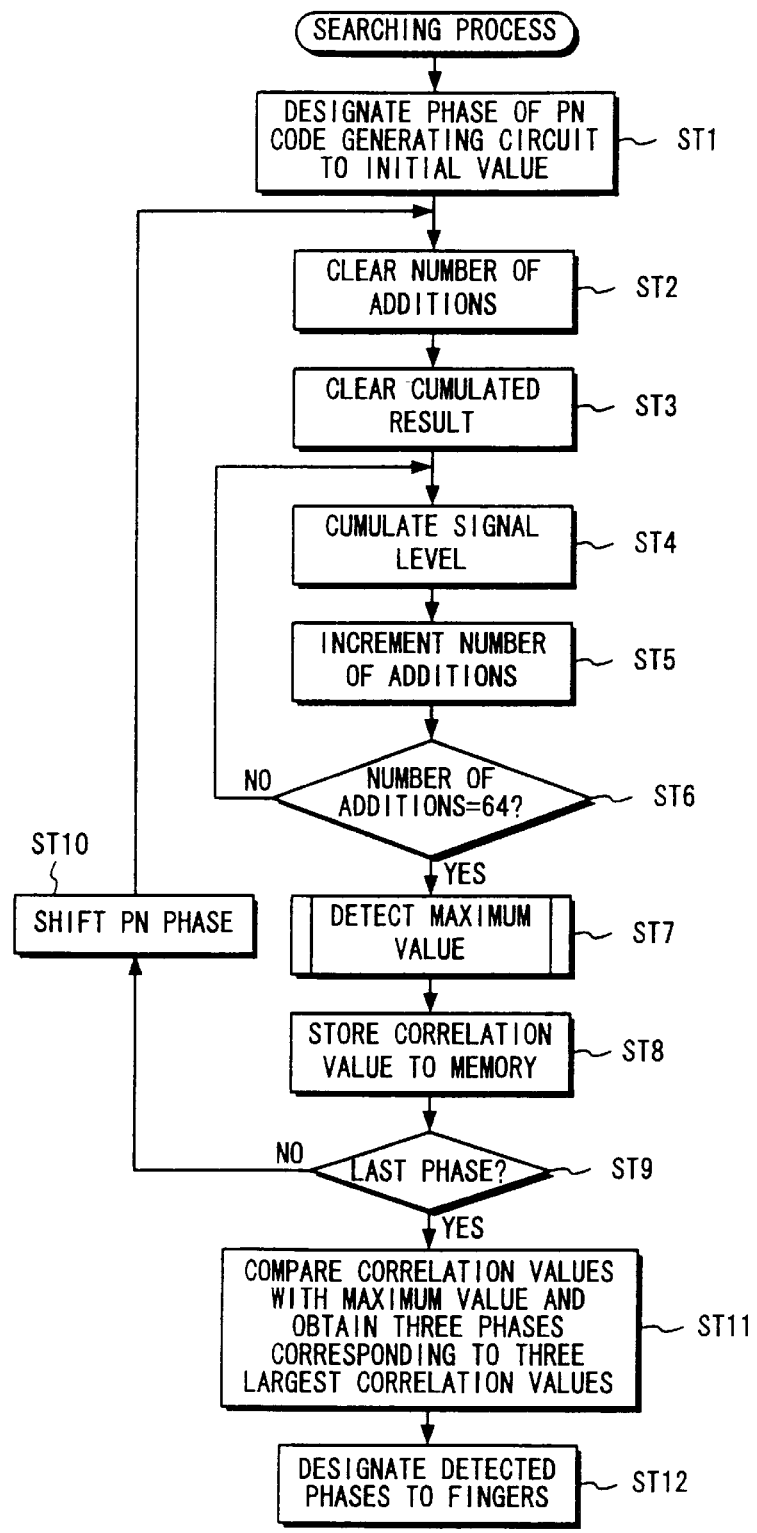
FIG. 4 is a flow chart for explaining an example of the structure of the searcher of the portable telephone terminal unit of CDMA type according to the present invention.

FIG. 4 is a flow chart showing an example of the process of the searcher shown in FIG. 2. In FIG. 4, the phase of the PN code generating circuit 54 is designated to the initial value (at step ST1). The number of additions is cleared (at step ST2). The cumulated value of the adding circuit 58 is cleared (at step ST3).

When the initial phase is designated to the PN code generating circuit 54, the multiplying circuit 53 de-spreads the received signal with the designated PN code. The adding circuit 58 cumulates the de-spread signal level (at step ST4). Whenever the signal level is cumulated, the number of additions is incremented (at step ST5). Next, it is determined whether or not the number of additions exceeds a predetermined value (for example, 64) (at step ST6). The signal level is cumulated until the number of additions becomes 64.

When the number of additions becomes 64, the maximum value detecting circuit 60 detects the maximum value of the correlation values. The maximum value is stored in the maximum value memory 61 (at step ST7). The correlation value at this point is stored in the memory 59 (at step ST8).

It is determined whether or not the last phase of the PN code generating circuit 54 has been designated (at step ST9). When the last phase has not been designated, the phase of the PN code is advanced or delayed by a predetermined value (at step STIO).

Thereafter, the flow returns to step ST2. With the phase of the PN code that has been shifted for the predetermined value, the above-described process is repeated.

In such a manner, while the PN code is being shifted every ½ chip, correlation values are obtained. When the phase of the PN code is shifted for one period, at step ST9, the three largest correlation values are obtained with the maximum value stored in the memory 59 (at step ST11). The three phases corresponding to the three largest correlation values are designated to the fingers 251A, 251B, and 251C (at step ST12).

When a phase searching process is performed, all the phases may be categorized as a plurality of phase groups. In this case, the phase searching process is performed for each group. For example, all the phases are categorized into four groups. The phase searching process is performed for each group. The maximum value of each group is detected. The maximum value of each group is compared. Thus, an optimum phase is determined.

Figure 5:
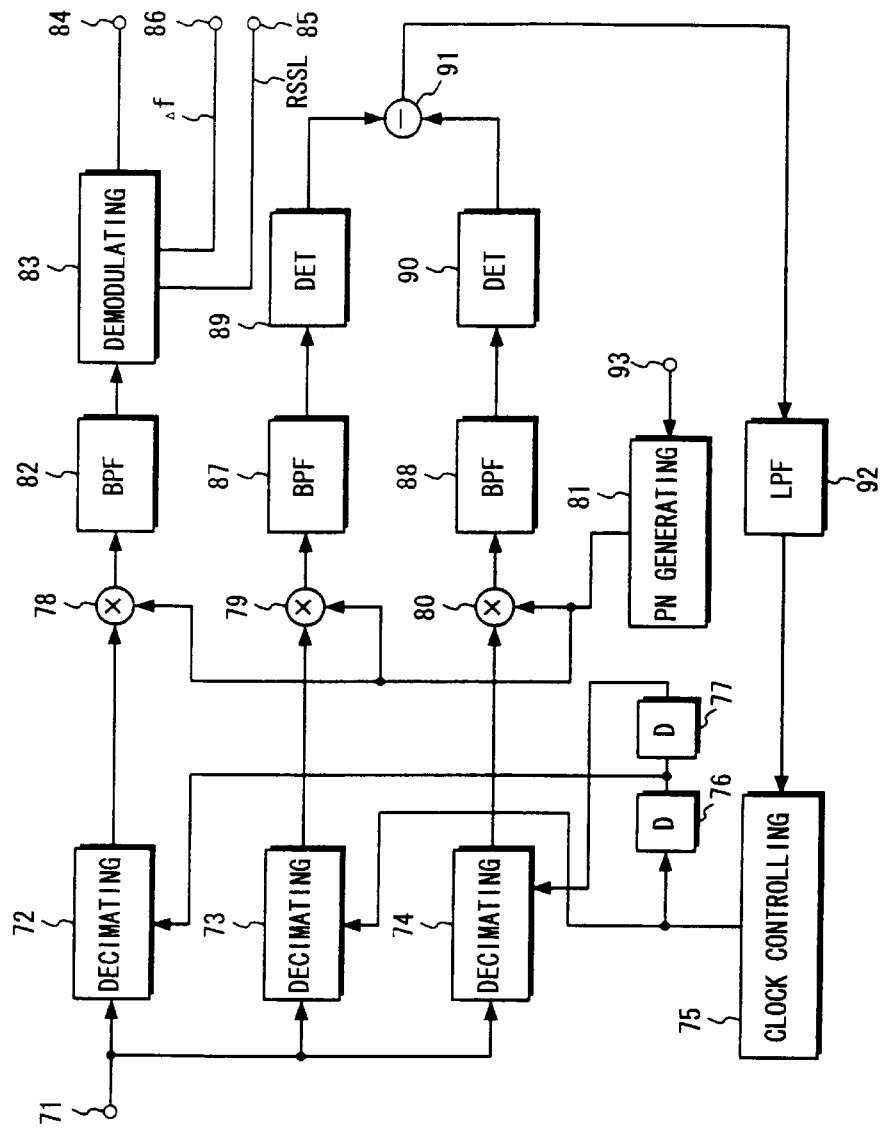
FIG. 5 is a block diagram showing an example of the structure of a finger of the portable telephone terminal unit of CDMA type according to the present invention.

FIG. 5 is a block diagram showing the structure of each of the fingers 25A, 25B, and 25C of the portable telephone terminal unit according to the present invention. In FIG. 5, a digital signal is supplied from the A/D converter 24 (see FIG. 1) to an input terminal 71. As described above, the sampling frequency of the A/D converter 24 is higher than the frequency of the PN code. In other words, the digital signal is over-sampled.

The digital signal is supplied from the input terminal 71 to decimating circuits 72, 73, and 74. A clock is supplied from a clock controlling circuit 75 to the decimating circuit 72 through a delaying circuit 76. The clock from the clock controlling circuit 75 is directly supplied to the decimating circuit 73. The clock from the clock controlling circuit 75 is supplied to the decimating circuit 74 through delaying circuits 76 and 77. Each of the delaying circuits 76 and 77 has a delay amount for ½ chip. The decimating circuits 72, 73, and 74 decimate the digital signal received from the input terminal 71.

Output signals of the decimating circuits 72, 73, and 74 are supplied to multiplying circuits 78, 79, and 80, respectively. The PN code is supplied from a PN code generating circuit 81 to the multiplying circuits 78, 79, and 80. The PN code generating circuit 81 generates the same PN code that was used to spread on the transmission side.

The multiplying circuit 78 multiplies the output signal of the decimating circuit 72 by an output signal of the PN code generating circuit 81. When the pattern and the phase of the received code match the pattern and the phase of the code received from the PN code generating circuit 81, the multiplying circuit 78 outputs a de-spread signal. An output signal of the multiplying circuit 78 is supplied to a demodulating circuit 83 through a band pass filter 82.

The demodulating circuit 83 demodulates the received signal. The demodulating circuit 83 outputs demodulated data. The demodulated data is output from an output terminal 84. The demodulating circuit 83 detects the level of the received signal. The signal level is obtained from an output terminal 85. The demodulating circuit 83 detects a frequency error. The frequency error is obtained from an output terminal 80.

The multiplying circuits 79 and 80 multiply output signals of the decimating circuits 73 and 74 by the output signal of the PN code generating circuit 81, respectively. The clock of the clock controlling circuit 75 is directly supplied to the decimating circuit 73. The clock supplied from the clock controlling circuit 75 to the decimating circuit 74 is delayed by one chip. Assuming that the phase of the output signal of the decimating circuit 72 is the center phase, an output signal with a phase advanced by ½ chip from the center phase and an output signal with a phase delayed by ½ chip from the center phase are obtained from the decimating circuits 73 and 74, respectively. The multiplying circuits 79 and 80 multiply the signal with the phase advanced by ½ chip from the center phase and the signal with the phase delayed by ½ chip from the center phase by the code received from the PN code generating circuit 81. Thus, de-spread output signals with the phases advanced by ½ chip and delayed by ½ chip from the center phase are obtained. Output signals of the multiplying circuits 79 and 80 are used to form a DLL (Delay Locked Loop).

In other words, the output signals of the multiplying circuits 79 and 80 are supplied to level detecting circuits 89 and 90 through band pass filters 87 and 88, respectively. The level detecting circuits 89 and 90 output the levels of the de-spread signals with the phases advanced by ½ chip and delayed by ½ chip. Output signals of the level detecting circuits 89 and 90 are supplied to a subtracting circuit 91.

The subtracting circuit 91 compares the level of the de-spread signal with the phase advanced by ½ chip and the level of the de-spread signal with the phase delayed by ½ chip. An output signal of the subtracting circuit 91 is supplied to the clock controlling circuit 75 through a loop filter 92. The clock controlling circuit 75 controls the clock supplied to the decimating circuits 72 to 74 so that the level of the output signal of the subtracting circuit 91 becomes 0.

Assuming that an input signal is over-sampled eight times by the A/D converter 24 and that the resultant signal is ⅛ decimated by the decimating circuits 72 to 74, the decimating circuits 72 to 74 output signals at intervals of every eight samples. When it is determined that the current timing is very late corresponding to the output signal of the subtracting circuit 91, the signal is output at intervals of every seven samples instead of every eight samples. Thus, the phase of the signal is advanced.

Initial phase data is supplied from an input terminal 93 to the PN code generating circuit 81. The initial phase data is designated corresponding to a path detected by the searcher 28. Corresponding to the fluctuation of the code, the above-described DLL loop operates so as to acquire the received code.

As described above, according to the portable telephone terminal unit of the present invention, since the searcher 28 has a circuit that detects the maximum value of correlation values and stores the maximum value, when an optimum path is determined, the sorting process for the correlation values can be simplified and thereby the load applied to the controller 29 can be alleviated. In the searcher shown in FIG. 2, a de-spread level is added for example 64 times for all phases of the PN code so as to obtain correlation values. Thus, the searching process takes a long time. Since the number of additions is decreased, the search time can be decreased. However, the accuracy of the correlation values deteriorates.

To solve this problem, the number of additions is designated to 32. It is determined whether or not each correlation value exceeds a predetermined threshold value. Only when each correlation value exceeds the predetermined threshold value, are 32 additions performed so as to obtain a correlation value. Thus, the searching process can be quickly performed without a deterioration of the accuracy.

Figure 6:
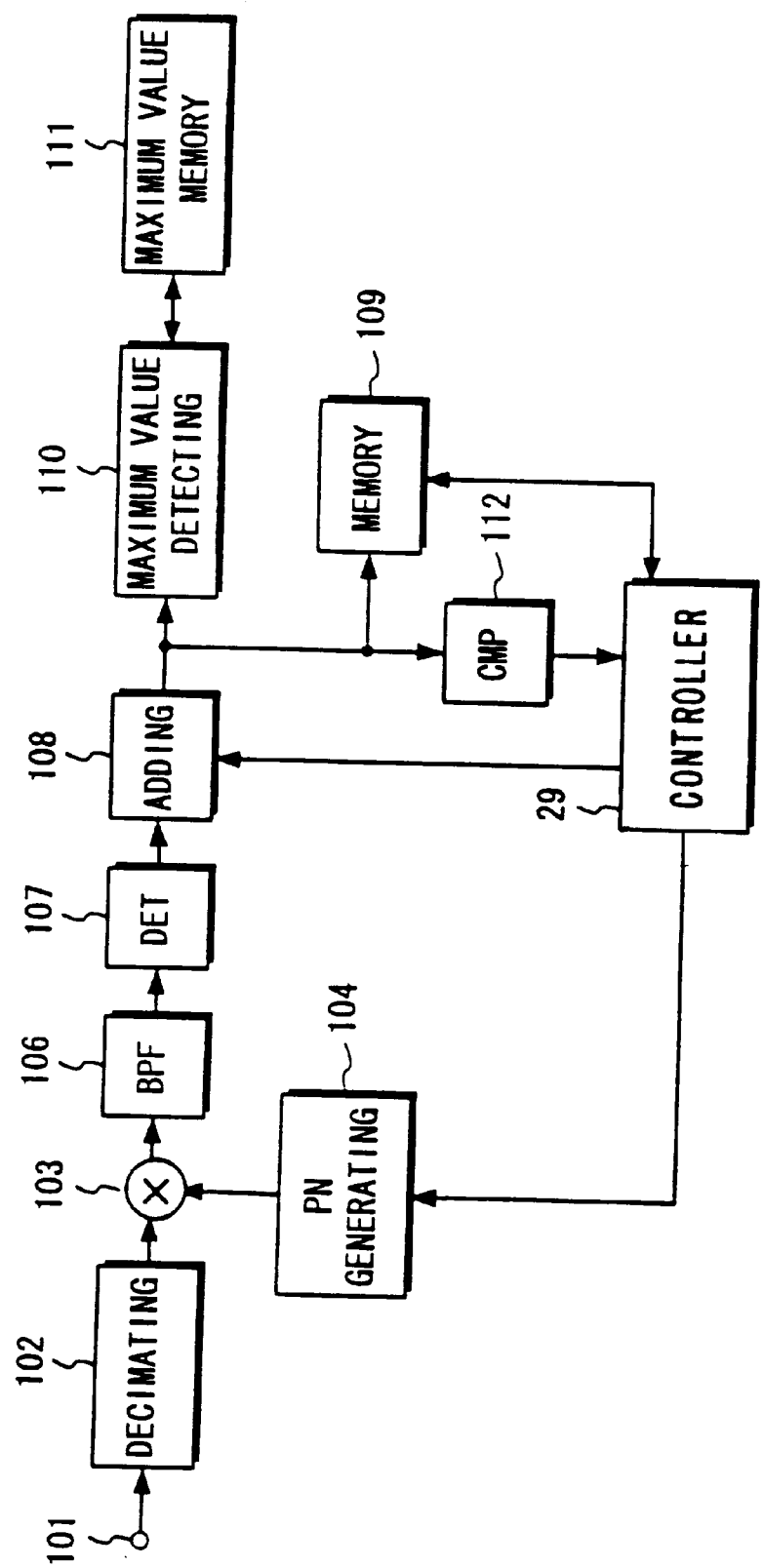
FIG. 6 is a block diagram showing another example of the structure of the portable telephone terminal unit of CDMA type according to the present invention.

FIG. 6 is a block diagram showing an example of the structure of which the searching process is quickly performed as described above. Referring to FIG. 6, a digital signal is supplied from the A/D converter 24 to an input terminal 101. The input terminal 101 supplies the digital signal to a decimating circuit 102. The decimating circuit 102 decimates the signal received from the input terminal 101. An output signal of the decimating circuit 102 is supplied to a multiplying circuit 103.

A PN code generating circuit 104 generates the same PN code that was used to spread on the transmission side. The phase of the PN code that is output from the PN code generating circuit 104 is designated by a controller 29. The PN code is supplied from the PN code generating circuit 104 to the multiplying circuit 103.

The multiplying circuit 103 multiplies the output signal of the decimating circuit 102 by the PN code generated by the PN code generating circuit 104. When the phase and pattern of the received code matches the phase and pattern of the code generated by the PN code generating circuit 104, the received signal de-spreads. Thus, the output level of the multiplying circuit 103 increases. An output signal of the multiplying circuit 103 is supplied to a level detecting circuit 107 through a band pass filter 107. The level detecting circuit 107 detects the output level of the multiplying circuit 103.

An output signal of the level detecting circuit 107 is supplied to an adding circuit 108. The adding circuit 108 cumulates the output signal of the level detecting circuit 107. With the cumulated value of the output level of the level detecting circuit 107, the correlation values of the code designated to the PN code generating circuit 104 and the received code are obtained.

The output signal of the level detecting circuit 107 is cumulated for example 32 times (namely, 32 additions are performed) by the adding circuit 108. An output signal of the adding circuit 108 is supplied to a comparator 112. The comparator 112 determines whether or not the value of the output signal of the adding circuit 108 exceeds a predetermined threshold value. When the value of the output signal is less than the predetermined threshold value, it is determined that there is almost no correlation in the current phase. The phase of the PN code generating circuit 104 is shifted to the next phase. Only when the value exceeds the predetermined threshold value, the output signal of the level detecting circuit 107 is cumulated more 32 times so as to accurately detect a correlation value.

The output signal of the adding circuit 108 is supplied to a memory 109 and to a maximum value detecting circuit 110. The maximum value detecting circuit 110 obtains the maximum value of the correlation values. The maximum value of the correlation value is stored in a maximum value memory 111.

The phase of the PN code received from the PN code generating circuit 104 is shifted every predetermined number of chips. The correlation value is obtained from the output signal of the adding circuit 308 for each phase. The number of additions of the adding circuit 108 is for example 32. When the cumulated value is equal to or less than the predetermined threshold value, it is determined that the correlation is weak. In this case, the phase of the PN code generating circuit is shifted to the next phase. Only when the cumulated value exceeds the predetermined threshold value, more 32 additions are performed. Thus, a correlation value is obtained. The correlation value is stored in the memory 109. After the phases of the PN code have been designated for one period, for example three paths are selected in the order of larger correlation values. Codes of the three paths are designated to the fingers 25A, 25B, and 25C. When the three paths are selected in the order of larger correlation values, the maximum value of the correlation values stored in the maximum value detecting circuit 111 is used.

Figure 7:
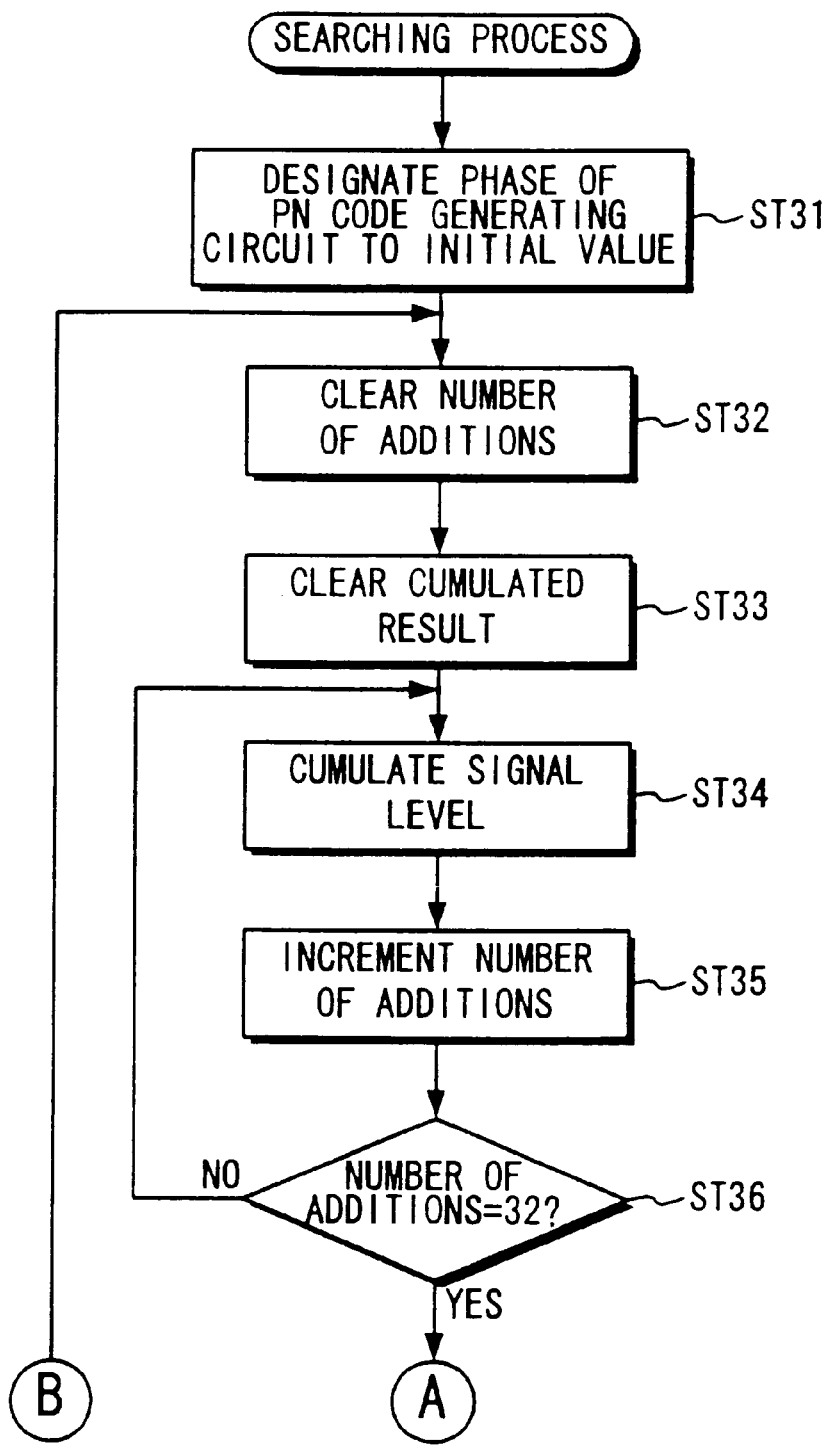
FIGS. 7 and 8 are flow charts for explaining another example of the structure of the searcher of the portable telephone terminal unit of CDMA type according to the present invention.
Figure 8:
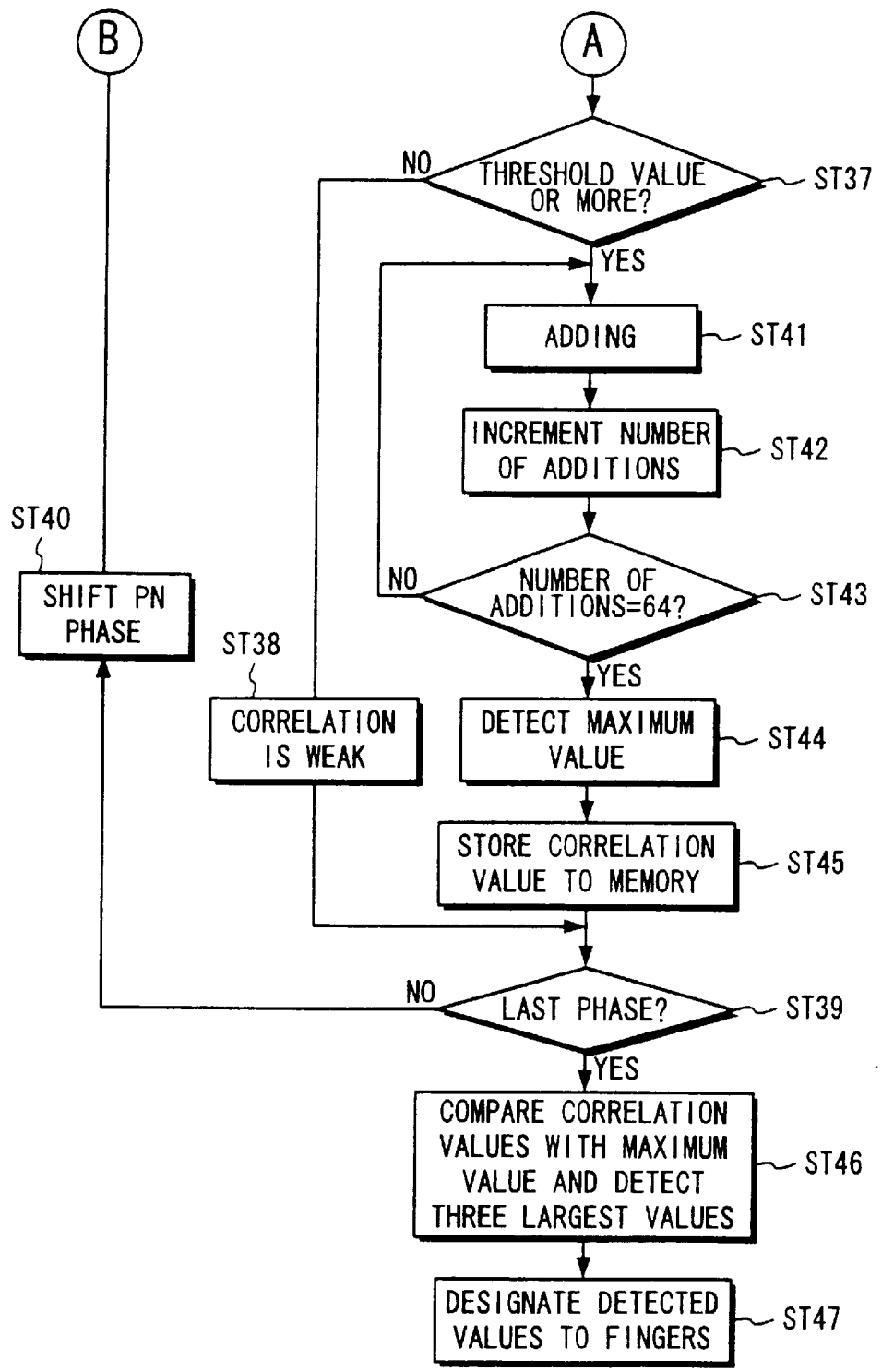
Figure 9:
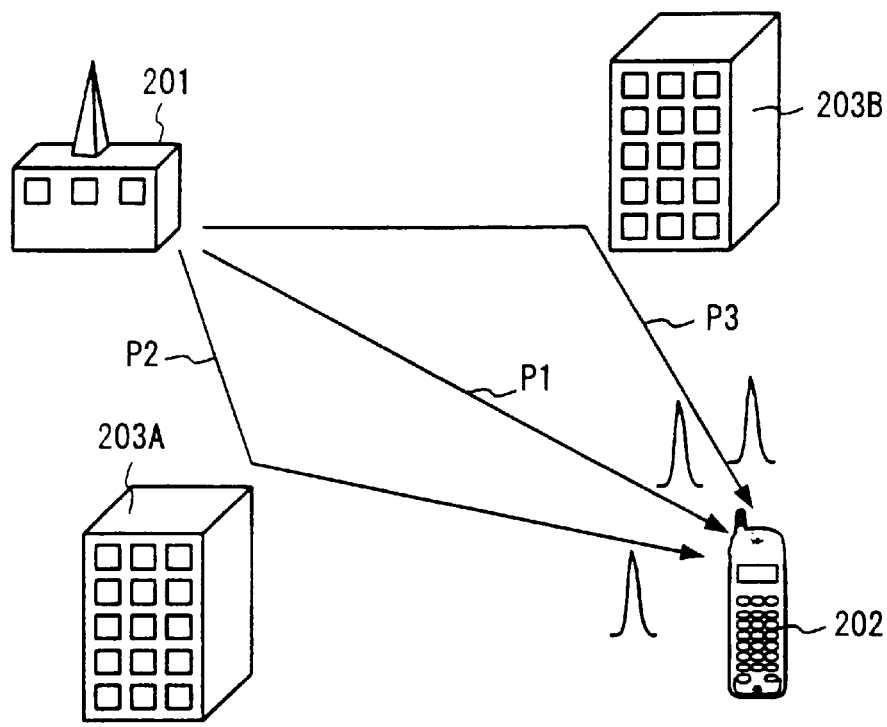
FIG. 9 is a schematic diagram for explaining multi-paths.
Figure 10:
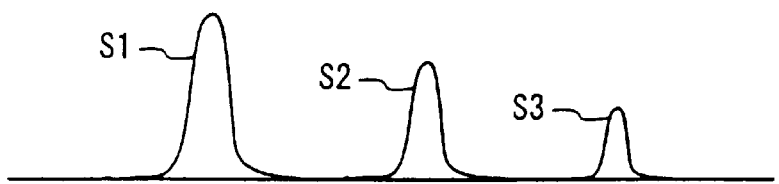
FIG. 10 is a waveform diagram showing a waveform for explaining multi-paths.
Figure 11:
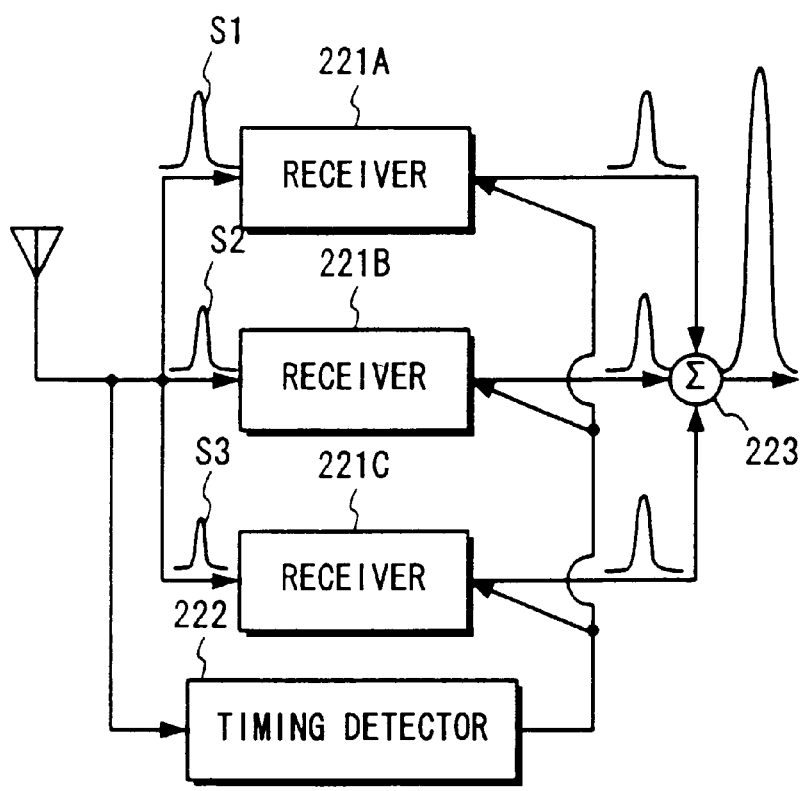
FIG. 11 is a block diagram for explaining a diversity RAKE system.
Figure 12:
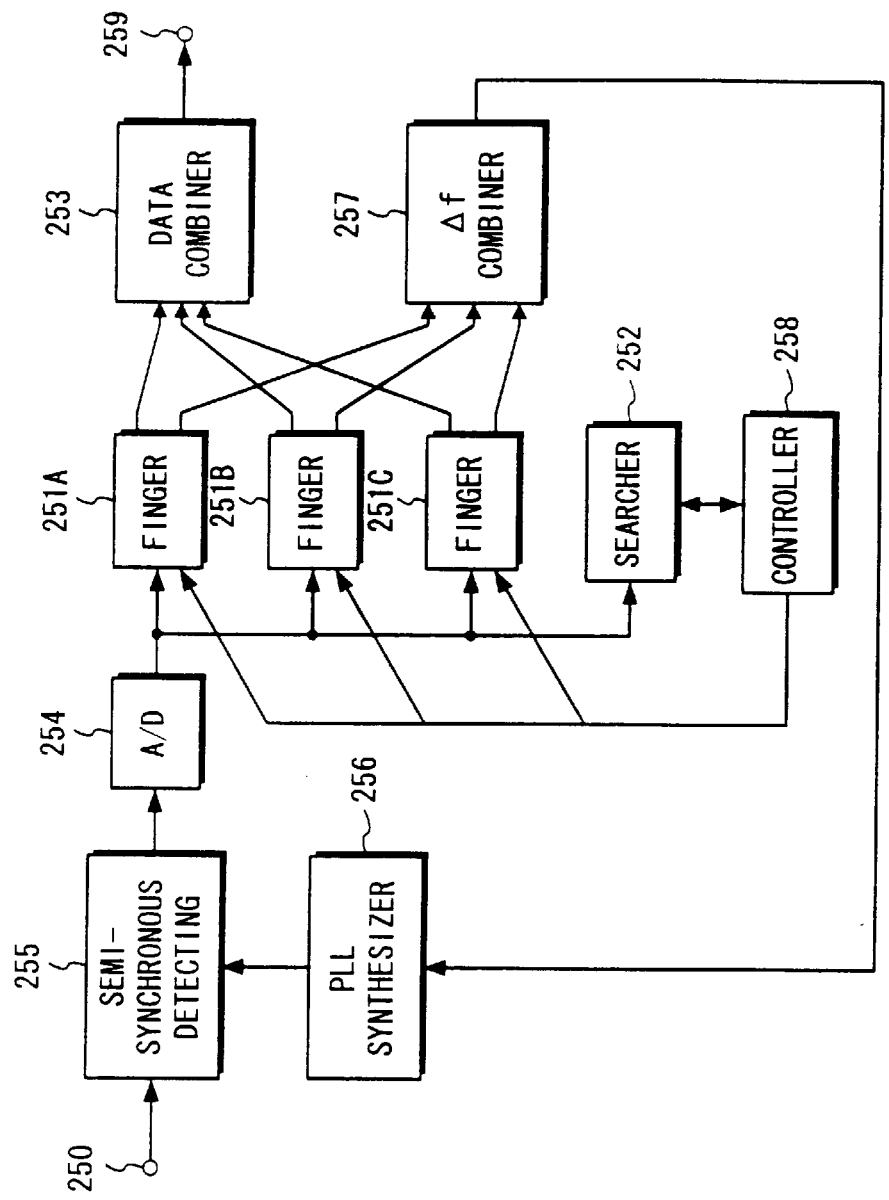
FIG. 12 is a block diagram showing an example of a receiver of the diversity RAKE system.
Figure 13:
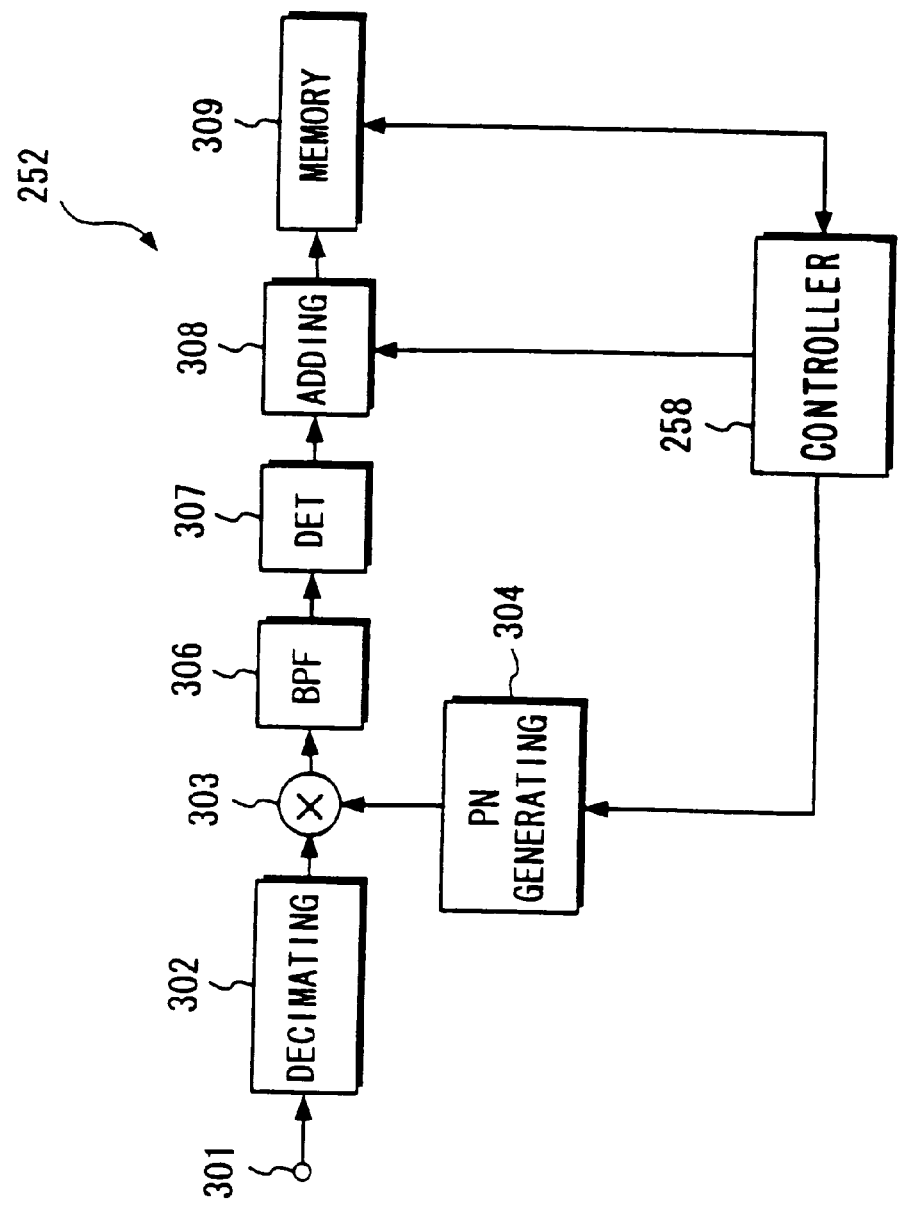
FIG. 13 is a block diagram showing an example of a conventional searcher.
Figure 14:
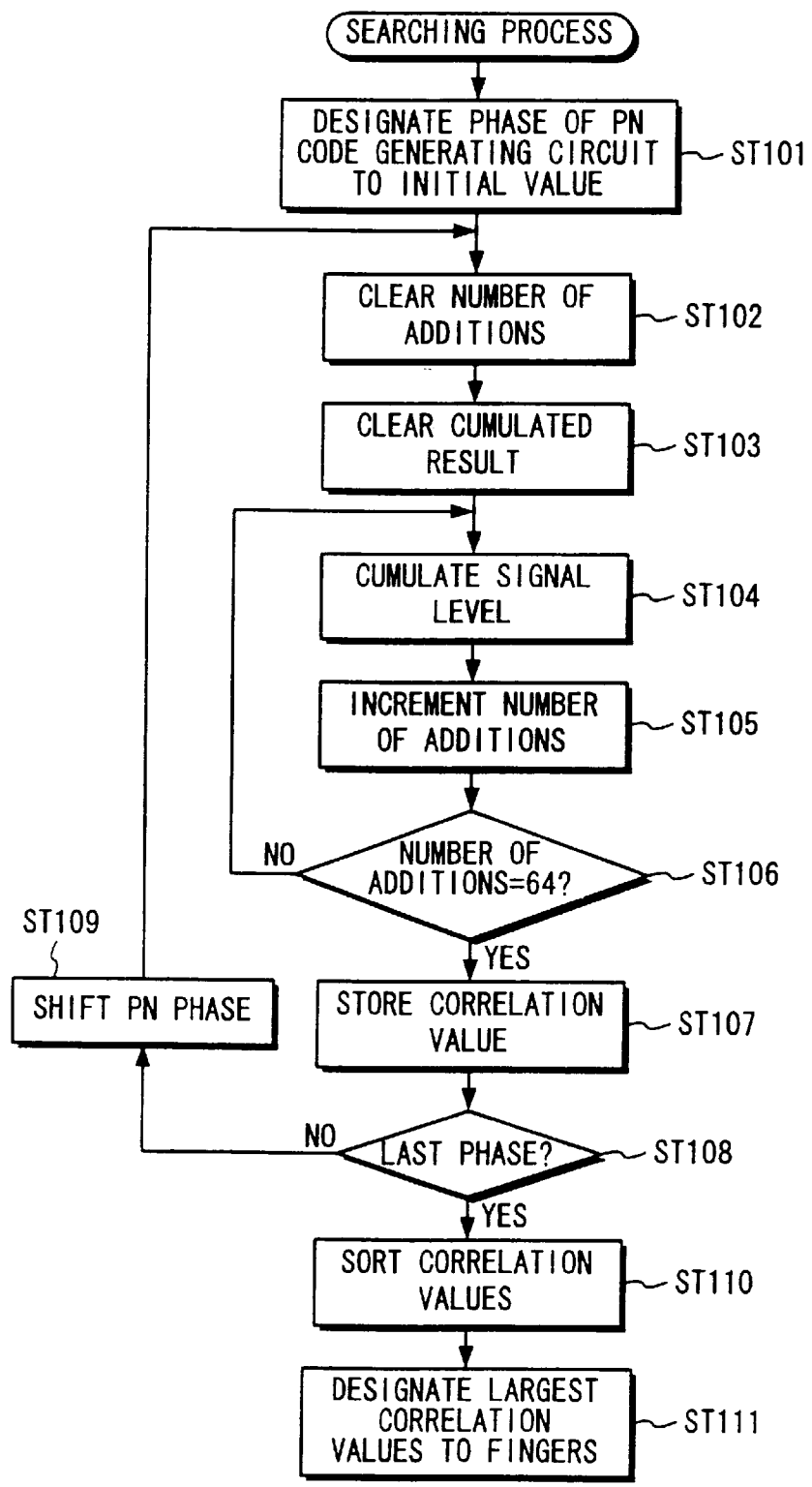
FIG. 14 is a flow chart for explaining the example of the conventional searcher.

FIGS. 7 and 8 are flow charts showing another example of the process of the searcher shown in FIG. 6. In FIGS. 7 and 8, the phase of the PN code generating circuit 104 is designated to the initial value (at step ST31). The number of additions is cleared (at step ST32). The cumulated result of the adding circuit 108 is cleared (at step ST33).

When the initial phase is designated to the PN code generating circuit 104, the multiplying circuit 103 de-spreads the received signal with the designated PN code. The adding circuit 108 cumulates the de-spread signal level (at step ST34). Whenever the signal level is cumulated, the number of additions is incremented (at step ST35). Next, it is determined whether or not the number of additions exceeds a predetermined value (for example, 32) (at step ST36). The signal level is cumulated until the number of additions becomes 32.

When the number of additions becomes 32, it is determined whether or not the cumulated result exceeds a predetermined threshold value (at step ST37). When the cumulated result does not exceed the predetermined threshold value, it is determined that the correlation is weak (at step ST38). In addition, it is determined whether or not the last phase of the PN code generating circuit 104 has been designated (at step ST39). When the last phase has not been designated, the phase of the PN code is advanced or delayed by a predetermined value (for example ½ chip) (at step ST40). Thereafter, the flow returns to step ST32. With the phase of the PN code that has been shifted for the predetermined value, the above-described process is repeated.

When the cumulated result exceeds the predetermined threshold value as the determined result at step ST37, additions are continued (at step ST41). Whenever one addition is performed, the number of additions is incremented (at step ST42). It is determined whether or not the number of additions becomes a predetermined value (for example, 64) (at step ST43). The signal level is cumulated until the number of additions becomes for example 64.

When the number of additions becomes 64, the maximum value detecting circuit 110 detects the maximum value of the correlation values. The maximum value is stored in the maximum value memory 111 (at step ST44). The current correlation value is stored in the memory 109 (at step ST45).

It is determined whether or not the last phase of the PN code generating circuit 104 has been designated (at step ST39). When the last phase has not been designated, the phase of the PN code is advanced or delayed by a predetermined value (at step ST40). Thereafter, the flow returns to step ST32. With the phase of the PN code that has been shifted for the predetermined value, the above-described process is repeated.

When the phase of the PN code is shifted for one period, at step ST39, the last phase of the PN code has been designated. Thus, the determined result at step ST39 becomes Yes. At this point, the three largest correlation values are obtained with the maximum value of the correlation values stored in the maximum value memory 111 (at step ST46). The three phases corresponding to the three largest correlation values are designated to the fingers 25A, 25B, and 25C (at step ST47).

In this example, a reversely converted output signal is cumulated for example 32 times. It is determined whether or not the cumulated value exceeds a predetermined threshold value. When the cumulated value does not exceed the threshold value, it is determined that the correlation is weak. At this point, the cumulation is stopped and a correlation value of the next phase is obtained. Thus, when the correlation is weak, the cumulation is not wastefully performed. Consequently, the searching process can be quickly performed. After the reversely converted output data has been cumulated 32 times, when the cumulated value exceeds the threshold value, the output data is cumulated more 32 times. Thus, the accuracy in which correlation values are compared does not deteriorate.

According to the present invention, the searcher that detects multi-paths has a maximum value detecting circuit and a maximum value memory. The maximum value detecting circuit detects the maximum value of correlation values that have been obtained. The maximum value memory stores the maximum value of the correlation values that have been obtained. When the phase of the PN code is shifted every predetermined number of chips and correlation values with a received code are obtained, the maximum value of the correlation values is detected by the maximum value detecting circuit. The maximum value is stored in the maximum value memory. Thus, when a plurality of the largest correlation values are selected, the maximum value of the correlation values stored in the maximum value memory can be used. Thus, since a complicated sorting process for repeating comparing operations is omitted, the load applied to the controller is alleviated.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A receiving apparatus for receiving a signal that has been spectrum-spread with a spread code, comprising:

a searcher for searching paths of signals received over multi-paths;

a plurality of fingers for de-spreading the received signals received over the multi-paths and demodulating data contained therein; and a combiner for combining output data of said plurality of fingers, wherein said searcher includes:

code generating means for generating a code having a phase that is successively shifted in a same pattern as the spread code that is used to spectrum-spread the signals being received;

de-spreading means for multiplying the received signals received over the multi-paths by the code generated by said code generating means so as to de-spread each received signal to original data;

correlation value detecting means for obtaining correlation values for individual phases designated by said code generating means with output data of said de-spreading means; and maximum value detecting means for detecting a maximum value of the correlation values and storing the maximum value, and wherein the output data of said de-spreading means is demodulated with a phase corresponding to the maximum value stored in said maximum value detecting means.

2. A receiving method for receiving a transmitted signal that has been spectrum-spread with a spread code, comprising the steps of:

causing a searcher to search paths of signals received over multi-paths;

causing a plurality of fingers to de-spread the received signals received over the multi-paths and to demodulate data contained therein; and causing a combiner to combine output data of the plurality of fingers, wherein the searcher generates a code whose phase is successively shifted in a same pattern as the spread code used to spectrum spread the signal that is transmitted, multiplies the received signals by the code generated so as to de-spread the spread signal to original data, obtains correlation values for individual phases designated with output data that has been de-spread, detects a maximum value of the correlation values, and stores the maximum value, and wherein the data from said step of causing the plurality of fingers to de-spread the received signals is demodulated with a phase corresponding to the maximum value.

3. The receiving method as set forth in claim 2, wherein said step of causing the searcher includes dividing all the phases into a plurality of groups, detecting the maximum value of the correlation values for each of the groups, and demodulating the data from said step of causing the plurality of fingers to de-spread the received signals with a phase corresponding to the maximum value of each group.

4. A terminal unit for use with a radio system for spectrum-spreading a transmission signal with a spread code, transmitting a resultant signal, varying the pattern and phase of a code sequence of the spread code, and performing a multiple-access operation, comprising:

a searcher for searching paths of signals received over multi-paths;

a plurality of fingers for despreading the received signals received over the multi-paths and demodulating data contained therein; and a combiner for combining output data of said plurality of fingers, wherein said searcher includes:

code generating means for generating a code having a phase that is successively shifted in a same pattern as the spread code that is used to spectrum spread the signals being received;

de-spreading means for multiplying the received signals received over the multi-paths by the code generated by said code generating means so as to de-spread each received signal to original data;

correlation value detecting means for obtaining correlation values for individual phases designated by said code generating means with output data of said de-spreading means; and maximum value detecting means for detecting a maximum value of the correlation values and storing the maximum value, and wherein the output data of said de-spreading means is demodulated with a phase corresponding to the maximum value stored in said maximum value detecting means.

\* \* \* \* \*